(12) United States Patent
Park et al.

(10) Patent No.: US 8,064,006 B2
(45) Date of Patent: Nov. 22, 2011

(54) BACKLIGHT ASSEMBLY AND METHOD OF ASSEMBLING THE SAME AND LIQUID CRYSTAL DISPLAY INCLUDING BACKLIGHT ASSEMBLY

(75) Inventors: Jin-Hee Park, Cheonan-si (KR); Bong-Hyun You, Yongin-si (KR); Jae-Chang Choi, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 312 days.

(21) Appl. No.: 12/205,152

(22) Filed: Sep. 5, 2008

(65) Prior Publication Data

US 2009/0174838 A1    Jul. 9, 2009

(30) Foreign Application Priority Data

Jan. 3, 2008    (KR) .................. 10-2008-0000817

(51) Int. Cl.
| | |
|---|---|
| G02F 1/1333 | (2006.01) |
| G02F 1/1335 | (2006.01) |
| G09F 13/04 | (2006.01) |
| G09F 13/08 | (2006.01) |
| F21V 5/00 | (2006.01) |
| F21V 7/04 | (2006.01) |
| H01J 9/24 | (2006.01) |

(52) U.S. Cl. ............ 349/58; 349/61; 349/64; 349/65; 362/97.1; 362/97.2; 362/244; 362/600; 445/24

(58) Field of Classification Search .............. 349/58, 349/64, 61, 65; 362/97.2, 97.3, 97.1, 244, 362/600; 445/24
See application file for complete search history.

(56) References Cited

U.S. PATENT DOCUMENTS

| | | | |
|---|---|---|---|
| 2006/0216982 A1* | 9/2006 | Ishida | ............ 439/331 |
| 2007/0002590 A1 | 1/2007 | Jang et al. | |
| 2007/0053176 A1* | 3/2007 | Chou | ............ 362/97 |
| 2007/0153515 A1* | 7/2007 | Hong et al. | ............ 362/237 |

FOREIGN PATENT DOCUMENTS

WO    WO2008108039    9/2008

OTHER PUBLICATIONS

European Search Report dated May 3, 2009 for Application No. 08021855.5-2205.

* cited by examiner

*Primary Examiner* — Brian M. Healy
*Assistant Examiner* — Jerry Blevins
(74) *Attorney, Agent, or Firm* — F. Chau & Associates, LLC

(57) ABSTRACT

A backlight assembly includes a light source unit including a circuit board, a light source disposed on a first plane of the circuit board, and at least one connection unit disposed on a second plane opposite to the first plane of the circuit board and electrically connected to the light source, a receiving container having a bottom plate and sidewalls extending from edges of the bottom plate and receiving the light source unit, the bottom plate including at least one opening portion in which the connection unit is inserted and exposed to the outside, and at least one driving unit disposed at a rear surface of the receiving container and connected to the connection unit for driving the light source unit.

17 Claims, 8 Drawing Sheets

BACKLIGHT ASSEMBLY AND METHOD OF ASSEMBLING THE SAME AND LIQUID CRYSTAL DISPLAY INCLUDING BACKLIGHT ASSEMBLY

CROSS-REFERENCE TO RELATED APPLICATION

This application claims priority from Korean Patent Application No. 10-2008-0000817 filed on Jan. 3, 2008, the disclosure of which is incorporated by reference herein.

BACKGROUND OF THE INVENTION

1. Technical Field

The present disclosure relates to a backlight assembly and a method of assembling the same, and a liquid crystal display including the backlight assembly, and more particularly, to a method of assembling the backlight assembly, and a liquid crystal display including the backlight assembly.

2. Discussion of the Related Art

Liquid crystal displays (LCDs) are one of the most widely used flat panel displays. LCDs include a liquid crystal panel for displaying an image and a backlight assembly for supplying light to the liquid crystal panel. The backlight assembly typically includes a light source that generates light, one or more optical members for diffusing/focusing the light distributed from the light source sheets, and a housing unit for receiving the light source and the one or more optical members. The backlight assembly may further include a driving unit that can drive the light source, e.g., an inverter assembly.

Recently, a light emitting diode (LED) characterized by low power consumption and high brightness has been widely used as a light source unit of the backlight assembly. For example, a plurality of LEDs are mounted on a printed circuit board to form a light source unit. As the size of an LCD panel increases, a direct-type light source unit may be disposed under the LCD panel.

Conventional direct-type backlight assemblies include a plurality of lamps as the light source unit and are received horizontally in a receiving container. A driving unit may be disposed in the rear of the receiving container. In this case, the receiving container may include a plurality of opening portions, e.g., wire leads, to connect the light source unit with the driving unit.

In the aforementioned backlight assembly, however, it is necessary to additionally attach a blocking member, e.g., tape, for preventing light leakage or infiltration of foreign matter through the opening portions formed in the receiving container. Accordingly, the backlight assembly may be more difficult to assemble and the production cost of the backlight assembly may increase.

SUMMARY OF THE INVENTION

Embodiments of the present invention provide a method of assembling the backlight assembly.

Embodiments of the present invention also provide a liquid crystal display including the backlight assembly.

According to an exemplary embodiment of the present invention, there is provided a backlight assembly including a light source unit including a circuit board, a light source disposed on a first plane of the circuit board, and at least one connection unit disposed on a second plane opposite to the first plane of the circuit board and electrically connected to the light source, a receiving container having a bottom plate and sidewalls extending from edges of the bottom plate and receiving the light source unit, the bottom plate including at least one opening portion in which the connection unit is inserted and exposed to the outside, and at least one driving unit disposed at a rear surface of the receiving container, connected to the connection unit and driving the light source unit.

According to an exemplary embodiment of the present invention, there is provided a method of assembling a backlight assembly, the method including preparing a light source unit including a circuit board, a light source disposed on a first plane of the circuit board, and at least one connection unit disposed on a second plane opposite to the first plane of the circuit board and electrically connected to the light source, and a receiving container having a bottom plate and sidewalls extending from edges of the bottom plate and receiving the light source unit, the bottom plate including at least one opening portion in which the connection unit is inserted and exposed to the outside, assembling the light source unit with the receiving container by receiving the light source unit in the receiving container so that the connection unit is exposed to the outside through the opening portion, and disposing at least one driving unit at a rear surface of the receiving container and connecting the driving unit to the exposed connection unit.

According to an exemplary embodiment of the present invention, there is provided a liquid crystal display including a liquid crystal display panel displaying an image, and a backlight assembly disposed under the liquid crystal display panel and providing light to the liquid crystal display panel, wherein the backlight assembly includes a light source unit including a circuit board, a light source disposed on a first plane of the circuit board, and at least one connection unit disposed on a second plane opposite to the first plane of the circuit board and electrically connected to the light source, a receiving container having a bottom plate and sidewalls extending from edges of the bottom plate and receiving the light source unit, the bottom plate including at least one opening portion in which the connection unit is inserted and exposed to the outside, and at least one driving unit disposed at a rear surface of the receiving container and connected to the connection unit for driving the light source unit.

BRIEF DESCRIPTION OF THE DRAWINGS

Exemplary embodiments of the present invention will become apparent by reference to the following detailed description taken in conjunction with the accompanying drawings, wherein.

DETAILED DESCRIPTION OF EXEMPLARY EMBODIMENTS

Figure 1A:
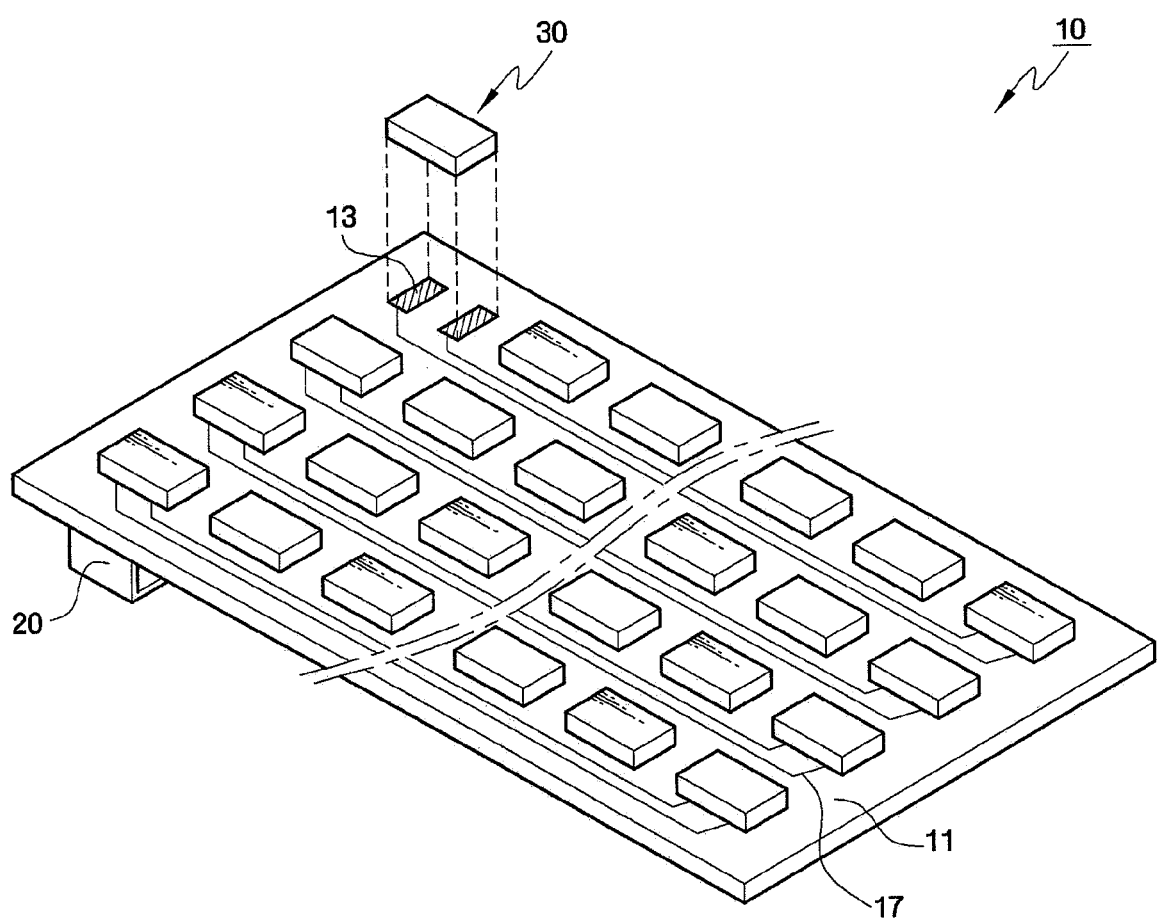
FIG. 1A is a perspective view of an exemplary light source unit used in a backlight assembly according to an exemplary embodiment of the present invention.

Exemplary embodiments of the present invention will be described in detail with reference to the accompanying drawings. The present invention may, however, be embodied in many different forms and should not be construed as being limited to the embodiments set forth herein. Like reference numerals refer to like elements throughout the specification.

A light source unit used in a backlight assembly according to an exemplary embodiment of the present invention will be described in detail with reference to FIGS. 1A through 1C.

Figure 1B:
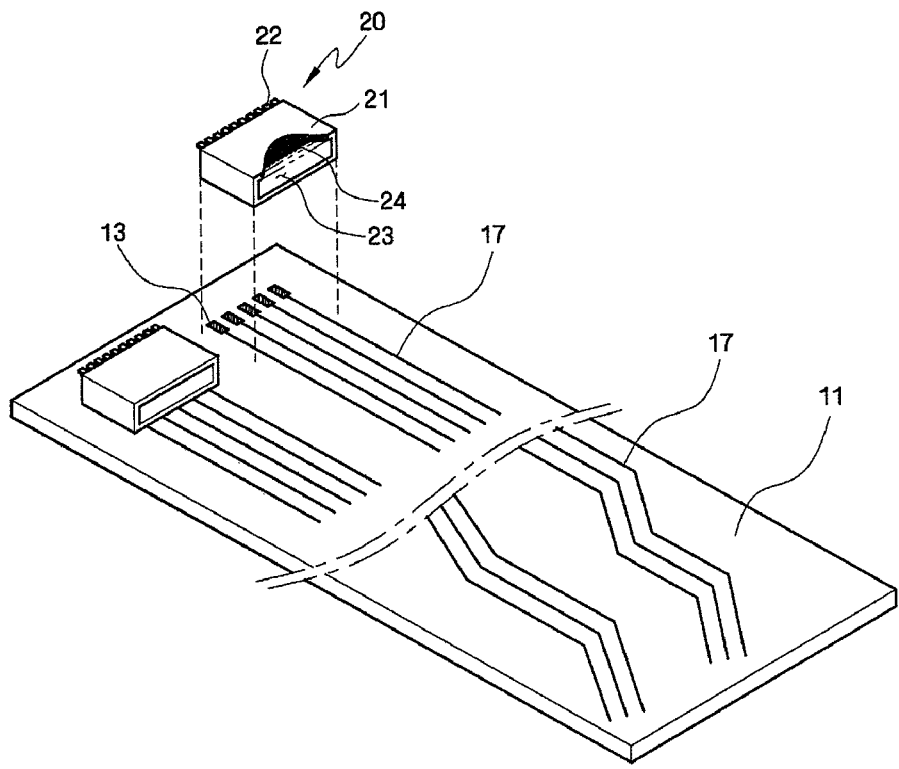
FIG. 1B is a perspective view illustrating a rear surface of the light source unit shown in FIG. 1A.

Referring to FIGS. 1A and 1B, a light source unit 10 includes a circuit board 11, a plurality of LED chip packages 30, and a connection unit 20.

The circuit board 11 may be formed of an insulating material, e.g., epoxy resin, and may include a plurality of connection pads 13 and a plurality of wires 17 on its first or second plane.

The plurality of connection pads 13 of the circuit board 11 are connected to the plurality of wires 17 and may be formed of a metal having excellent conductivity, e.g., gold (Au) or copper (Cu). The plurality of connection pads 13 may be formed on the first or second plane of the circuit board 11, and the plurality of LED chip packages 30 and the connection unit 20 are mounted thereon.

The plurality of wires 17 of the circuit board 11 are connected to the plurality of connection pads 13 and provide an externally applied signal, e.g., a driving signal for driving the plurality of LED chip packages 30 mounted on the connection pads 13, to the connection pads 13. The plurality of wires 17 may be formed of substantially the same material as the connection pads 13, e.g., a metal having excellent conductivity.

The LED chip packages 30 are operated using a light source which generates light by the externally applied driving signal. The plurality of LED chip packages 30 are mounted on the plurality of connection pads 13 formed on the first plane of the circuit board 11. Each of the LED chip packages 30 includes a LED chip (not shown) generating internal light, and a mold (not shown) surrounding the LED chip made of, for example, EMC. In addition, shapes of the LED chip packages 30 should not be limited to the particular shapes shown and described herein and all well-known shapes can be applied thereto.

The plurality of LED chip packages 30 may be disposed on the first plane of the circuit board 11 to be spaced apart from each other at constant intervals. Here, white light is emitted from each of the plurality of LED chip packages 30. Also, red light, green light, and blue light are emitted from the corresponding LED chip packages 30, respectively. In such cases, the LED chip packages 30 may be arranged in a stripe shape, however, exemplary embodiments of the present invention are not limited thereto.

A predetermined reflective member (not shown) may be formed on the first plane of the circuit board 11, that is, the surface of the circuit board 11 having the plurality of LED chip packages 30. That is, in order to prevent the light emitted from the LED chip packages 30 from being leaked downward with respect to the circuit board 11 and to allow the light to be uniformly illuminated upward with respect to the circuit board 11, the reflective member may be formed on an area other than the area of the surface of the circuit board 11 where the plurality of LED chip packages 30 are positioned. Here, as the reflective member, common reflective sheets, for example, can be used, however, exemplary embodiments of the present invention are not limited thereto. Any type of known reflective member capable of reflecting light may be used as the reflective member.

At least one connection unit 20 may be disposed on a second plane of the circuit board 11. Referring to FIG. 1B, the at least one connection unit 20 may be disposed on the plurality of connection pads 13 formed on the second plane of the circuit board 11. While an exemplary embodiment shows an arrangement in which a pair of connection units are formed on the circuit board 11, embodiments of the present invention are not limited to the illustrated arrangement.

The connection unit 20 may be electrically connected to the plurality of wires 17 formed on the circuit board 11 through the connection pads 13. The connection unit 20 may be electrically connected to the plurality of LED chip packages 30 formed on the first plane of the circuit board 11 through the wires 17. The connection unit 20 may be formed of a connector type, as shown by way of example, or a socket type.

Referring to FIG. 1B, the connection unit 20 includes a housing 21 made of an insulator, a plurality of leads 22 formed at one side of the housing 21, and a slot 23 formed at the opposite side of the housing 21.

The plurality of leads 22 formed at one side of the housing 21 may be electrically connected to the plurality of connection pads 13 of the circuit board 11 by soldering, for example. A predetermined connection member (not shown), e.g., an external connection member, is inserted into the slot 23. A plurality of connection pins 24 may be arranged inside the slot 23. The plurality of connection pins 24 are correspondingly connected to the external connection member inserted into the slot 23 to be connected to the plurality of leads 22 in a one-to-one relationship.

The light source unit 10 may be received in a receiving container 60 to be described later. The connection unit 20 of the light source unit 10 may be inserted into the opening portion 65 formed in the receiving container 60. Accordingly, the connection unit 20 of the light source unit 10 may be exposed to and easily connected to the outside of the receiving container 60, e.g., the driving unit 70 connected to the rear surface of the receiving container 60.

Figure 1C:
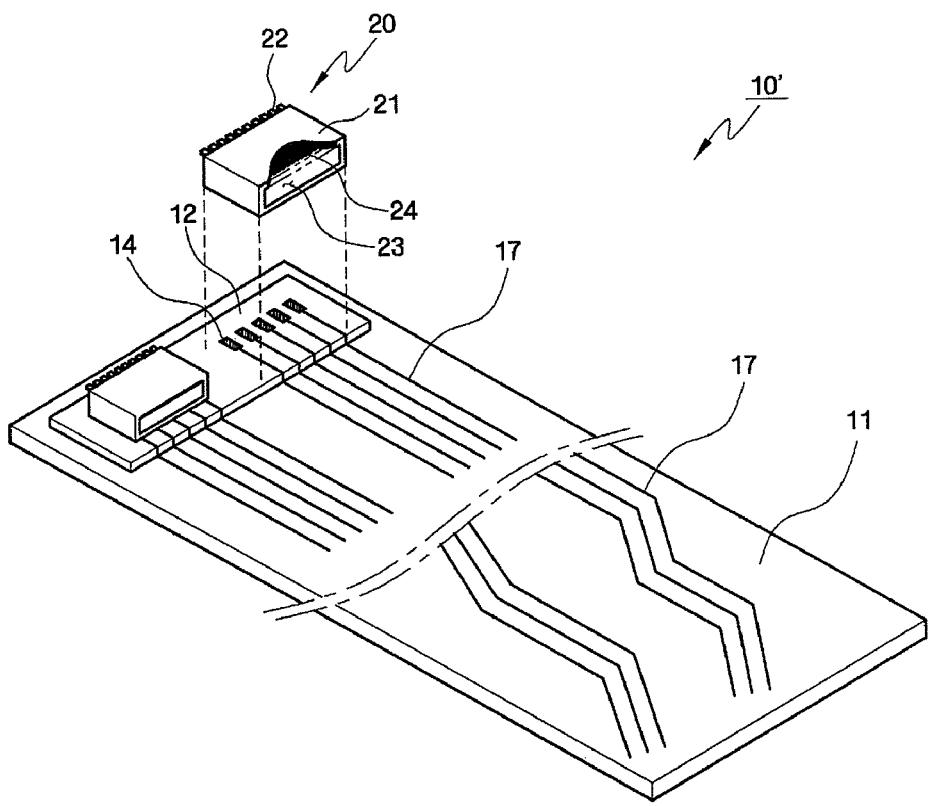
FIG. 1C is a perspective view illustrating a rear surface of another exemplary light source unit according to an exemplary embodiment of the present invention.

Referring to FIG. 1C, another exemplary light source unit 10' according to an exemplary embodiment of the present invention may further include a dummy circuit board 12.

The light source unit 10' may include a circuit board 11, a plurality of LED chip packages 30, and at least one connection unit 20.

The plurality of LED chip packages 30 may be formed on the first plane of the circuit board 11, and the connection unit 20 may be mounted on the second plane of the circuit board 11. The connection unit 20 may be electrically connected to the LED chip packages 30 through the plurality of wires 17 of the circuit board 11.

A dummy circuit board 12 may be disposed on the second plane of the circuit board 11. The dummy circuit board 12 may be disposed on an area of the second plane of the circuit board 11 having the connection unit 20. Accordingly, the connection unit 20 may be positioned on the dummy circuit board 12 as well.

A plurality of connection pads 14 where the connection unit 20 can be mounted may be formed on the dummy circuit board 12. In addition, a plurality of wires 18 electrically connected to the plurality of connection pads 14 may also be formed on the connection pads 14. The wires 18 of the dummy circuit board 12 may be electrically connected to the wires 17 of the circuit board 11, as described above.

Thus, the connection unit 20 disposed on the dummy circuit board 12 may be electrically connected to the plurality of wires 17 of the circuit board 11 formed on the dummy circuit board 12 through the plurality of connection pads 14 and the plurality of wires 18. The plurality of wires 18 are electrically connected to the plurality of LED chip packages (30 of FIG. 1A) positioned on one plane of the circuit board 11.

The dummy circuit board 12 may be formed of substantially the same material as the circuit board 11, e.g., epoxy resin.

The dummy circuit board 12 of the light source unit 10' has a size substantially the same as the opening portion 65 of the receiving container 60, and will be described later. Accordingly, when the light source unit 10' is received in the receiving container 60, the dummy circuit board 12 of the light source unit 10' and the connection unit 20 can be simultaneously inserted into the opening portion 65 of the receiving container 60 to then be connected with each other.

The dummy circuit board 12 of the light source unit 10' may have substantially the same thickness as that of the receiving container 60. Accordingly, when the light source unit 10' is received in the receiving container 60, and the dummy circuit board 12 of the light source unit 10' and the connection unit 20 are together inserted into the opening portion 65 of the receiving container 60 to then be connected, only the connection unit 20 of the light source unit 10' may protrude outside the receiving container 60.

That is, the light source unit 10' is formed so as to overlap with the dummy circuit board 12 having a stepped portion with respect to the circuit board 11 and the connection unit 20 on the second plane of the circuit board 11. In such a manner, when the light source unit 10' and the receiving container 60 are connected with each other, the dummy circuit board 12 of the light source unit 10' can prevent infiltration of foreign matter or a light leak due to the opening portion 65 of the receiving container 60. Accordingly, the light efficiency of the light source unit 10' can be increased and the ease of assembly of the light source unit 10' and the receiving container 60 can be improved.

A backlight assembly according to an embodiment of the present invention will be described in more detail with reference to FIGS. 2 through 4B. For convenience of illustration, backlight assemblies using the light source units shown in FIGS. 1A and 1B will be described. However, the light source unit shown in FIG. 1C may also be used in the backlight assembly.

Figure 2:
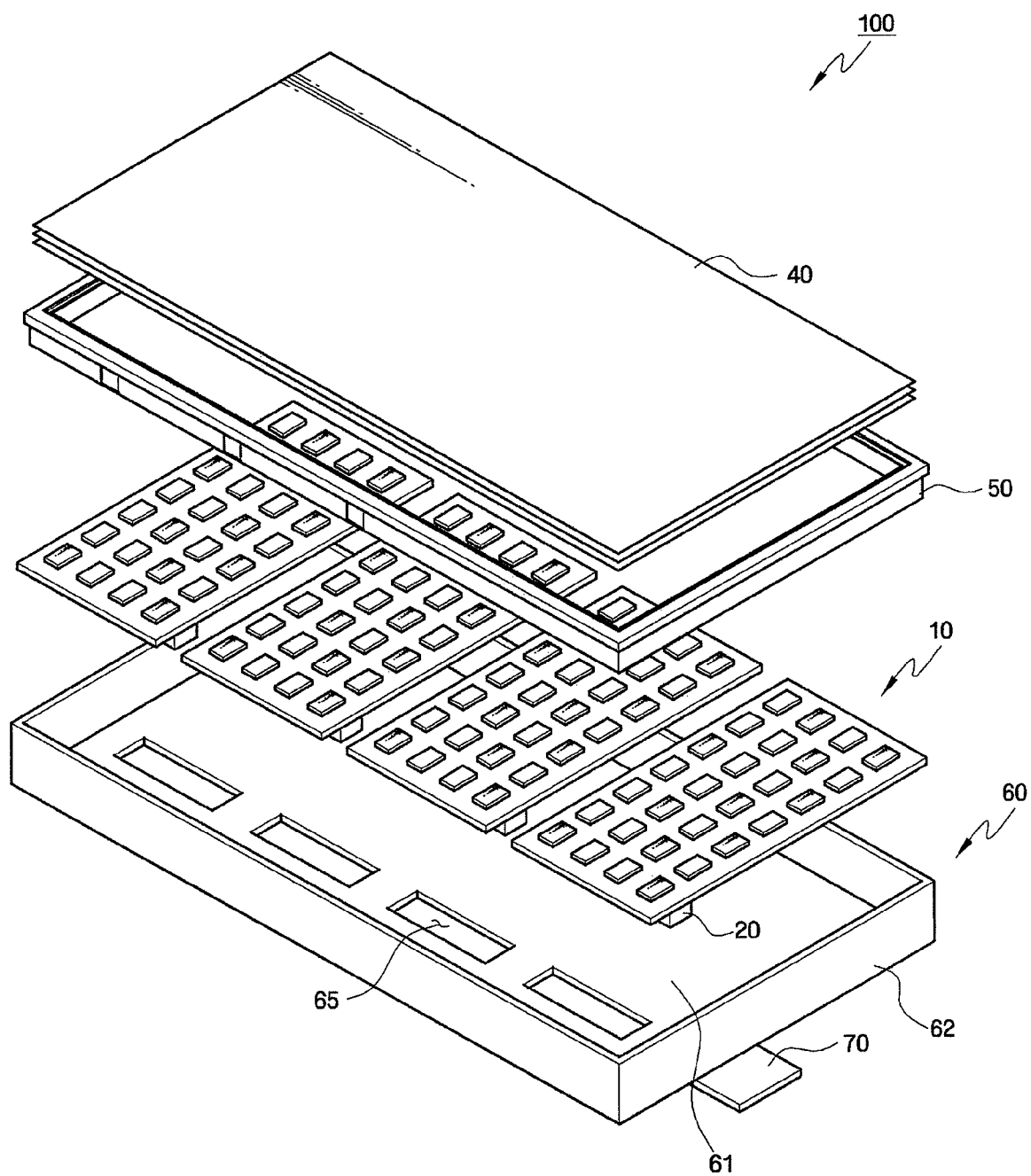
FIG. 2 is an exploded perspective view of a backlight assembly according to an exemplary embodiment of the present invention.
Figure 3:
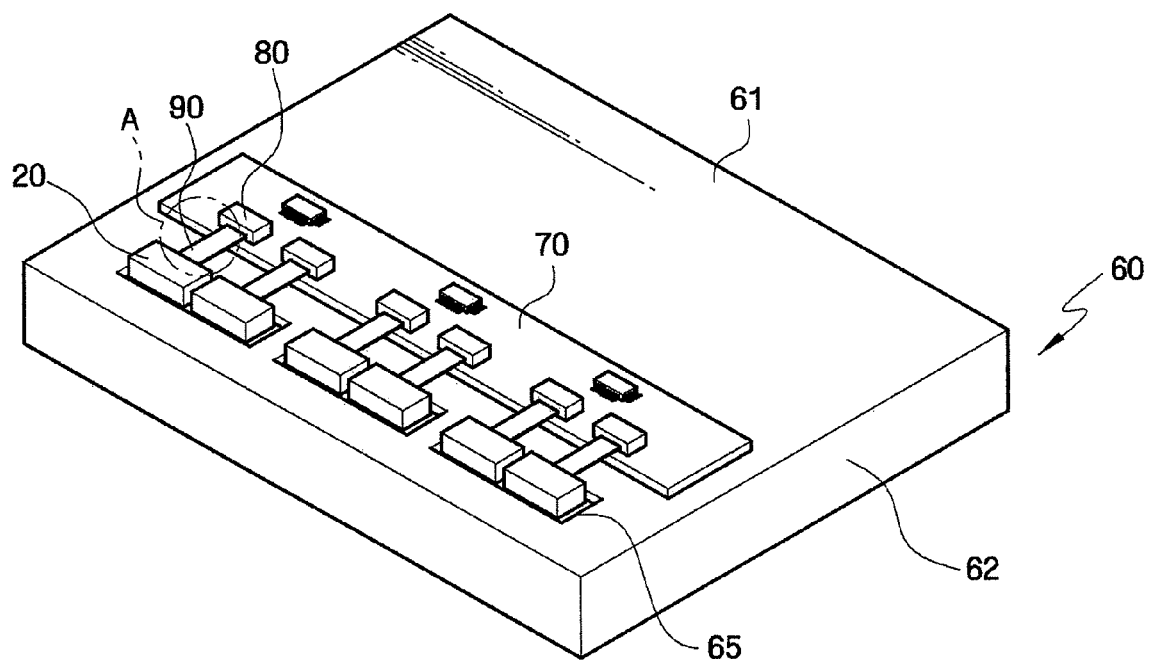
FIG. 3 is a perspective view illustrating a rear surface of the backlight assembly shown in FIG. 2.
Figure 4A:
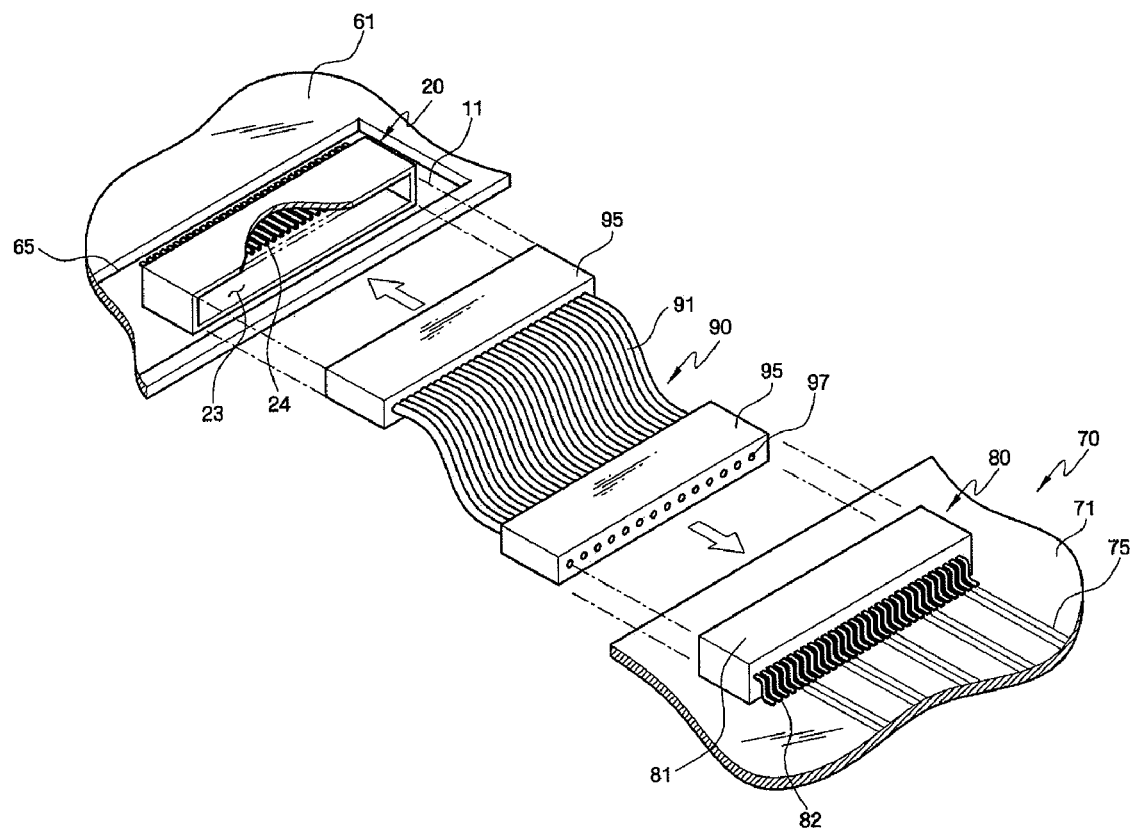
FIG. 4A is an enlarged view of a portion "A" shown in FIG. 3.
Figure 4B:
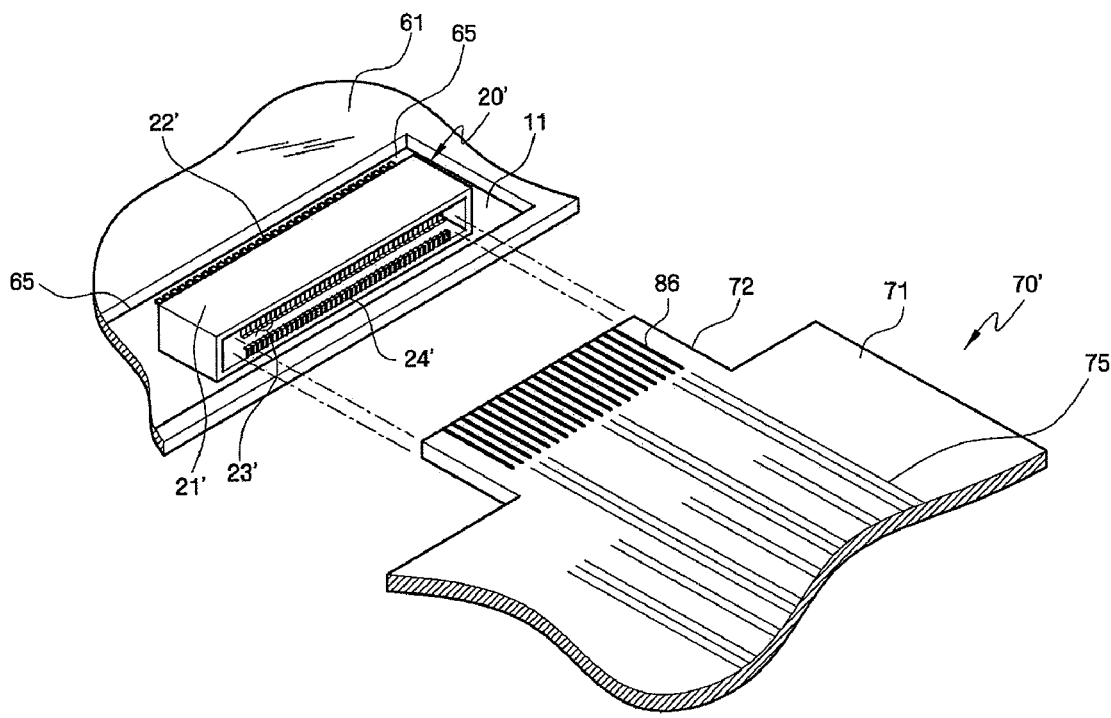
FIG. 4B is an enlarged view illustrating another example of the portion "A" shown in FIG. 3.

FIG. 2 is an exploded perspective view of a backlight assembly according to an exemplary embodiment of the present invention, FIG. 3 is a perspective view illustrating a rear surface of the backlight assembly shown in FIG. 2, FIG. 4A is an enlarged view of a portion "A" shown in FIG. 3, and FIG. 4B is an enlarged view illustrating another example of the portion "A" shown in FIG. 3.

Referring to FIGS. 1A, 1B, and 2, the backlight assembly 100 includes a light source unit 10, optical sheets 40, a mold frame 50, a receiving container 60, and a driving unit 70.

As described above with reference to FIGS. 1A and 1B, the light source unit 10 may be configured such that a plurality of light sources, e.g., a plurality of LED chip packages 30, are disposed on a first plane of a circuit board 11, and a connection unit 20 connected to an external circuit is disposed on a second plane of the circuit board 11.

The light source unit 10 may be plural light source units disposed inside the receiving container 60. Here, the plural light source units 10 are arranged in a longitudinal direction of the receiving container 60, e.g., in a direction substantially parallel to the short side of the receiving container 60, to be received in the receiving container 60.

The optical sheets 40 are disposed on the light source unit 10, and serve to diffuse and focus light coming from the light source unit 10. Examples of the optical sheets 40 include a diffusion sheet, a prism sheet, a protective sheet, and various other sheets with similar properties.

The mold frame 50 has a quadrangle shape, and receives the optical sheets 40 and the light source unit 10. The mold frame 50 can be formed of, for example, an insulating resin.

The receiving container 60 includes a bottom plate 61 and sidewalls 62 extending from the bottom plate 61. The receiving container 60 may have a rectangular parallelepiped shape, and an upper surface thereof may be open to provide a receiving space. The receiving container 60 receives the light source unit 10 and the optical sheets 40 in the receiving space. The receiving container 60 is combined to the mold frame 50 to fixedly receive the light source unit 10 and the optical sheets 40.

At least one opening portion 65 may be formed on the bottom plate 61 of the receiving container 60. The at least one connection unit 20 of the aforementioned light source unit 10 may be inserted into the at least one opening portion 65 to then be connected with each other in a one-to-one relationship.

The opening portion 65 may be formed along the long side or short side of the bottom plate 61 of the receiving container 60 and may be plurally formed along one of long sides of the bottom plate 61 of the receiving container 60. Alternatively, the opening portion 65 may be plurally formed along one or both of the long sides of the bottom plate 61 of the receiving container 60. By way of example, the opening portion 65 is formed along one of the long sides of the bottom plate 61, however, the opening portion 65 may also be plurally formed along both sides of the long sides of the bottom plate 61 of the receiving container 60.

The plurality of connection units 20 of the light source unit 10 are inserted into the opening portions 65 of the receiving container 60 to then be connected with each other. Here, the connection units 20 are fittingly inserted into the opening portions 65 to be connected with each other, but the connection method is not limited to the illustrated example.

The connection units 20 of the light source unit 10 fittingly connected to the opening portions 65 of the receiving container 60 are exposed to the outside of the receiving container 60, i.e., a rear surface of the receiving container 60. Accordingly, the driving unit 70 (described later) can be connected to the connection units 20 of the exposed light source unit 10, thereby improving the assembling efficiency of the light source unit 10 and the receiving container 60.

The opening portions 65 of the receiving container 60 are blocked by the connection units 20 of the light source unit 10, thereby preventing infiltration of foreign matter and a light leak of the light source unit 10.

At least one connection hole (not shown) may be correspondingly disposed on the circuit board 11 of the light source unit 10 and on the bottom plate 61 of the receiving container 60, respectively. Accordingly, the plurally formed connection hole allows the light source unit 10 and the receiving container 60 to be more securely connected to each other via a screw connection.

The connection hole may be plurally formed on the bottom plate 61 adjacent to the opening portion 65 of the receiving container 60 or on the circuit board 1 adjacent to the connection unit 20 of the light source unit 10. Accordingly, infiltration of foreign matter and a light leak of the light source unit 10 can be prevented by securely connecting the connection unit 20 of the light source unit 10 to the opening portion 65 of the receiving container 60. The receiving container 60 may be formed of a metal, for example, Al or Al alloy, but is not limited thereto.

At least one driving unit 70 may be disposed at a rear surface of the receiving container 60 and may be connected to the connection unit 20 of the light source unit 10 exposed by the opening portion 65. The driving unit 70 may include a plurality of electronic components and can generate a predetermined driving signal which can drive the light source unit 10.

Referring to FIGS. 3 and 4A, the light source unit 10 and the driving unit 70 are connected to each other using a predetermined connection member 90. Therefore, the driving signal generated from the driving unit 70 may be provided to the light source unit 10 through the connection member 90 to drive the light source unit 10.

The driving unit 70 is connected to and disposed on the rear surface of the receiving container 60. Here, the driving unit 70 may be positioned at one of the long sides of the receiving container 60, i.e., at one side of the bottom plate 61 where the opening portion 65 is formed, to be adjacent to the opening portion 65.

In addition, at least one connection unit 80 may be formed at the driving unit 70 to be connected to the connection unit 20 of the light source unit 10.

The light source unit 10 is received in the receiving container 60 and connected to the connection unit 80. The connection unit 20 of the light source unit 10 is inserted into the opening portion 65 of the receiving container 60 to be exposed to the outside of the receiving container 60, i.e., a rear surface of the bottom plate 61 of the receiving container 60.

The connection unit 20 of the light source unit 10 has substantially the same connection type as described above with reference to FIG. 1B, e.g., a connector type.

Like the connection unit 20 of the light source unit 10, the connection unit 80 of the driving unit 70 includes a housing 81 made of an insulator, a plurality of leads 82 formed at one side of the housing 81, and a slot (not shown) formed at the opposite side of the housing 81. In addition, a plurality of connection pins (not shown) may be arranged inside the slot of the connection unit 80 of the driving unit 70.

The connection unit 80 of the driving unit 70 may be mounted on the circuit board 71 of the driving unit 70 and connected to the plurality of wires 75 formed on the circuit board 71.

A predetermined connection member 90 may be provided between the connection unit 20 of the light source unit 10 and the connection unit 80 of the driving unit 70 for connecting the same. By way of example, the connection member 90 uses a flexible cable 91, but is not limited thereto.

The connection member 90 may include a flexible cable 91 and a cable holder 95. That is, the connection member 90 may include a flexible cable 91 having a plurality of wires separated and insulated from each other, and a cable holder 95 made of an insulator positioned at opposite ends of the flexible cable 91.

Accordingly, the connection unit 20 of the light source unit 10 and the connection unit 80 of the driving unit 70 are connected to each other by the connection member 90, that is, the flexible cable 91 and the cable holder 95. Thus, one cable holder 95 connected to one end of the flexible cable 91 is inserted into the slot 23 of the connection unit 20 of the light source unit 10, and another cable holder 95 connected to the other end of the flexible cable 91 is inserted into the slot of the connection unit 80 of the driving unit 70.

A plurality of pinholes 97 that can be correspondingly connected to the slot 23 of the connection unit 20 of the light source unit 10 and the slot of the connection unit 80 of the driving unit 70 may be arranged on each cable holder 95. The plurality of pinholes 97 and the plurality of wires of the flexible cable 91 are correspondingly connected to each other in a one-to-one relationship.

Therefore, the connection unit 20 of the light source unit 10 is electrically connected to the connection unit 80 of the driving unit 70 by the cable holder 95 and the flexible cable 91. Accordingly, the driving signal generated by the driving unit 70 may be provided to the connection unit 20 of the light source unit 10 through the connection unit 80 of the driving unit 70, the cable holder 95 and the flexible cable 91.

The light source unit 10 and the driving unit 70 may also be connected to each other by a socket connection, which will now be described in more detail with reference to FIGS. 3 and 4B. The light source unit 10 is received in the receiving container 60. The connection unit 20 of the light source unit 10 is inserted into the opening portion 65 of the receiving container 60 to be exposed to the outside of the receiving container 60, i.e., a rear surface of the bottom plate 61 of the receiving container 60.

Here, the connection unit 20' of the light source unit 10 may be formed of a socket type. That is, the connection unit 20' includes a housing 21' made of an insulator, a plurality of leads 22' formed at one side of the housing 21', and a slot 23' formed at the opposite side of the housing 21'.

As described above, the plurality of leads 22' may be electrically connected to the plurality of connection pads 13 formed on the circuit board 11 of the light source unit 10. In addition, a plurality of connection pins 24' opposite to the plurality of leads 22' are arranged inside the slot 23'. The plurality of connection pins 24' may be inwardly bent at a predetermined angle, e.g., about 90°, with respect to the housing 21' so as to be connected to socket connection units 72 of a driving unit 70.

The driving unit 70 may be positioned on the rear surface of the receiving container 60 to be adjacent to a plurality of opening portions 65.

At least one socket connection unit 72 into which the connection unit 20' of the light source unit 10 can, be inserted for connection may be formed at one side of the circuit board 71 of the driving unit 70. The socket connection unit 72 may protrude outwardly in consideration of a length in which it is inserted into the connection unit 20' of the light source unit 10.

In addition, the socket connection unit 72 may further include a plurality of connection pads 86 connected to the plurality of connection pins 24' arranged inside the slot 23' of the connection unit 20' of the light source unit 10. The plurality of connection pads 86 may be electrically connected to the plurality of wires 75 formed on the circuit board 71 of the driving unit 70'.

Meanwhile, the driving unit 70 and the light source unit 10 are connected to each other by inserting the socket connection unit 72 of the driving unit 70 into the connection unit 20' of the light source unit 10 exposed to the rear surface of the receiving container 60. Therefore, the driving signal generated by the driving unit 70 may be provided to the socket connection unit 72 of the driving unit 70 through the plurality of connection pads 86 and the connection unit 20' of the light source unit 10 to drive the light source unit 10.

Referring back to FIGS. 2 and 3, a predetermined blocking member, e.g., an insulating tape (not shown), is attached to the opening portion 65 of the receiving container 60 to be shielded from the outside. That is, as shown in FIG. 3, when the connection unit 20 of the light source unit 10 is inserted into the opening portion 65 of the receiving container 60 and connected to the driving unit 70, the insulating tape is attached to the opening portion 65 of the receiving container 60. The insulating tape can prevent light leakage or infiltration of foreign matter.

Figure 5:
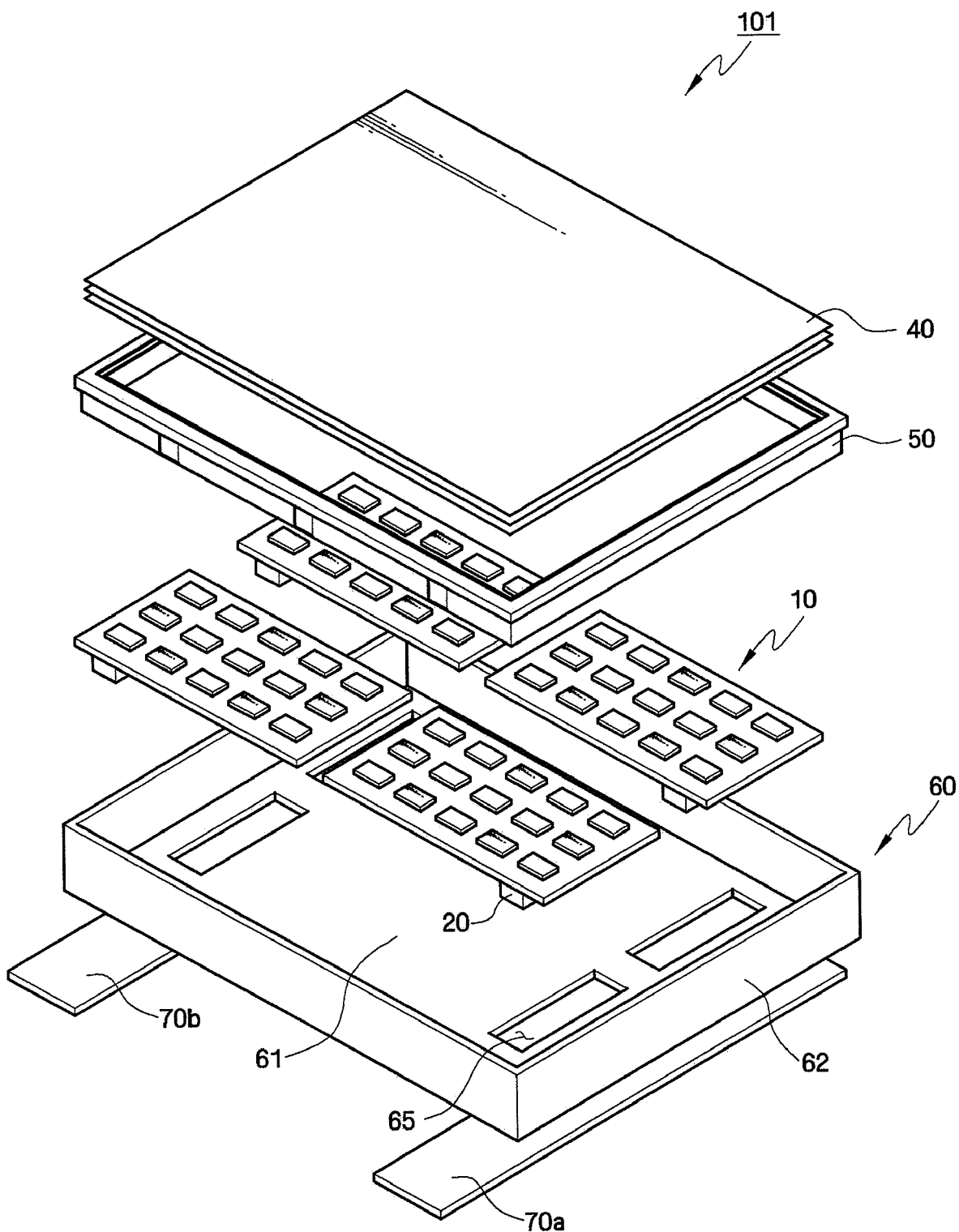
FIG. 5 is an exploded perspective view of a backlight assembly according to an exemplary embodiment of the present invention.
Figure 6:
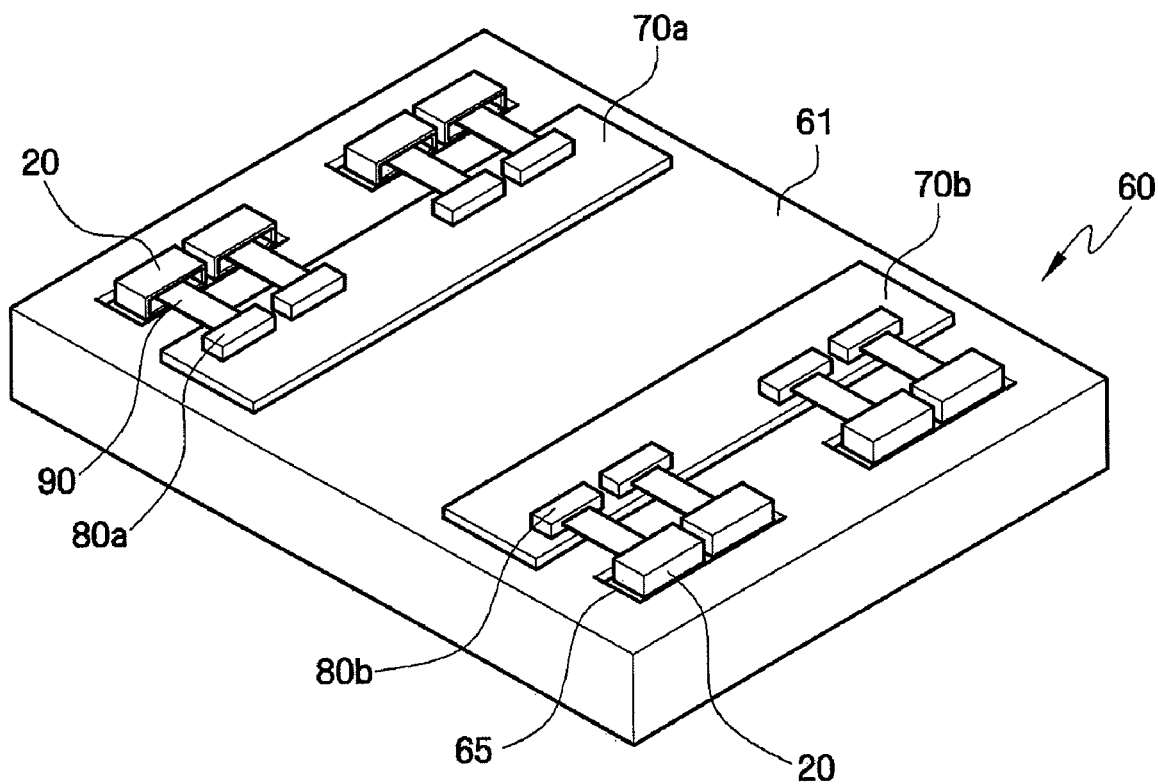
FIG. 6 is a perspective view illustrating a rear surface of the backlight assembly shown in FIG. 5.

A backlight assembly according to an exemplary embodiment of the present invention will be described in detail with reference to FIGS. 5 and 6.

The backlight assembly 101 includes a light source unit 10, optical sheets 40, a mold frame 50, a receiving container 60, and driving units 70a and 70b.

The light source unit 10, the optical sheets 40, and the mold frame 50 are substantially the same as those in FIGS. 2 and 3, and detailed explanations thereof will be omitted.

The receiving container 60 includes a bottom plate 61 and sidewalls 62 extending from the bottom plate 61. The receiving container 60 may have a rectangular parallelepiped shape, and an upper surface thereof may be open to provide a receiving space. The receiving container 60 receives the light source unit 10 and the optical sheets 40 in the receiving space. The receiving container 60 is combined with the mold frame 50 to fixedly receive the light source unit 10 and the optical sheets 40.

At least one opening portion 65 may be formed on the bottom plate 61 of the receiving container 60. The at least one connection unit 20 of the aforementioned light source unit 10 may be inserted into the at least one opening portion 65 to then be connected with each other.

By way of example, the opening portion 65 may be formed along the long side or short side of the bottom plate 61 of the receiving container 60.

The opening portion 65 may be plurally formed along both of the short sides of the bottom plate 61 of the receiving container 60. The plurality of opening portions 65 may be formed opposite to each other.

The light source unit 10 may be disposed as plural units inside the receiving container 60 to be connected thereto. The light source unit 10, that is, the plurality of light source units 10, are arranged in a horizontal direction of the receiving container 60, e.g., in a direction substantially parallel to the long side of the receiving container 60, to be received in the receiving container 60.

The connection unit 20 of the light source unit 10 may be inserted into the opening portion 65 in the receiving container 60 to then be connected with each other. The connection unit 20 may be fittingly inserted into the opening portion 65 to be connected with each other, but the connection method is not limited to the illustrated example.

The connection units 20 of the light source unit 10 fittingly connected to the opening portions 65 of the receiving container 60 are exposed to the outside of the receiving container 60, i.e., a rear surface of the receiving container 60. Accordingly, the driving units 70a and 70b can be connected to the connection units 20 of the exposed light source unit 10, thereby improving the ease of assembly of the light source unit 10 and the receiving container 60.

The opening portion 65 of the receiving container 60 may be blocked by the connection unit 20 of the light source unit 10, thereby preventing infiltration of foreign matter and light leaks of the light source unit 10.

As described above, at least one connection hole (not shown) may be correspondingly disposed on the light source unit 10 and the receiving container 60, respectively. That is, the connection hole may be plurally disposed on the bottom plate 61 adjacent to the opening portion 65 of the receiving container 60 and on the circuit board 11 adjacent to the connection unit 20 of the light source unit 10, respectively. Accordingly, the plurally formed connection hole allows the connection unit 20 of the light source unit 10 and the opening portion 65 of the receiving container 60 to be more securely connected to each other by a screw connection.

Accordingly, infiltration of foreign matter and a light leak of the light source unit 10 can be prevented by securely connecting the connection unit 20 of the light source unit 10 to the opening portion 65 of the receiving container 60.

The receiving container 60 may be formed of a metal, for example, Al or Al alloy, but is not limited thereto.

The driving units 70a and 70b may be positioned on the rear surface of the receiving container 60. The driving units 70a and 70b may include a plurality of electronic components and can generate a predetermined driving signal which can drive the light source unit 10.

The driving units 70a and 70b may be disposed at both of the short sides of the rear surface of the receiving container 60, i.e., the short sides of the rear surface adjacent to the opening portion 65, respectively, and may be electrically connected to the connection unit 20 of the light source unit 10 through the opening portion 65 of the receiving container 60. The driving signal generated from the driving units 70a and 70b may be provided to the light source unit 10 to drive the light source unit 10.

Connecting the driving units 70a and 70b with the light source unit 10 may be performed in substantially the same manner as in FIGS. 4A and 4B.

As described above, the driving units 70a and 70b may be connected to the light source unit 10 using a cable with a connector or socket, and a detailed explanation thereof will not be repeated.

In addition, a predetermined blocking member, e.g., an insulating tape (not shown), is attached to the opening portion 65 of the receiving container 60 to be shielded from the outside. That is, when the connection unit 20 of the light source unit 10 is connected to the driving units 70a and 70b by a connection member 90, the blocking member, that is, the insulating tape, is attached to the opening portion 65 of the receiving container 60. The insulating tape can then prevent light leakage or infiltration of foreign matter.

A liquid crystal display according to an exemplary embodiment of the present invention, including the aforementioned backlight assembly, will be described with reference to FIG. 7. For convenience of illustration, a liquid crystal display using the backlight assembly shown in FIG. 2 will be described. However, the backlight assembly shown in FIG. 5 may also be used in the liquid crystal display.

Figure 7:
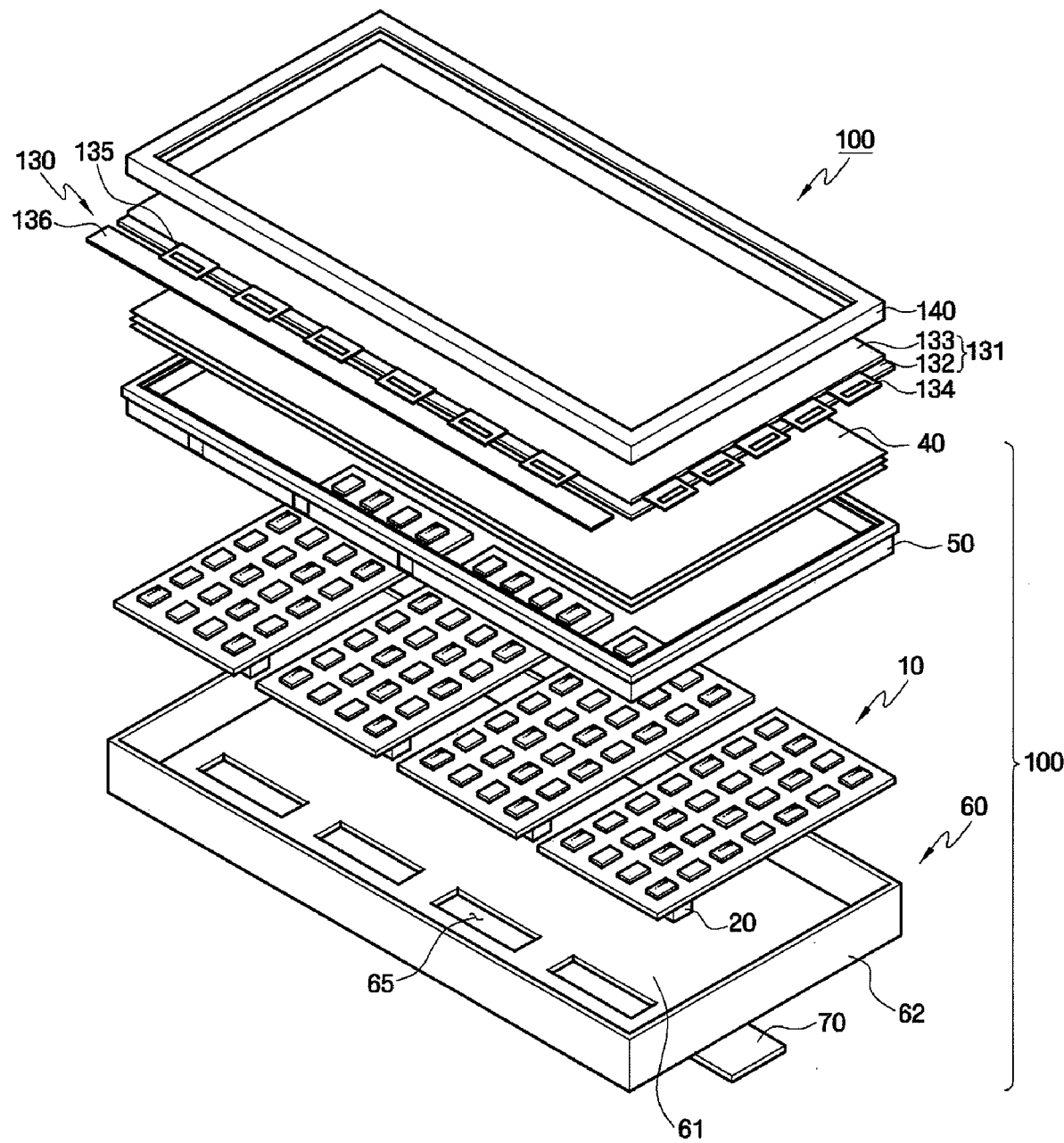
FIG. 7 is an exploded perspective view of a liquid crystal display according to an exemplary embodiment of the present invention, including the backlight assembly shown in FIG. 2.

FIG. 7 is an exploded perspective view of a liquid crystal display according to an exemplary embodiment of the present invention, including the backlight assembly shown in FIG. 2.

Referring to FIG. 7, the liquid crystal display 200 generally includes a liquid crystal panel assembly 130 and a backlight assembly 100.

The liquid crystal panel assembly 130 includes a liquid crystal panel 131 including two substrates, i.e., a thin film transistor ("TFT") substrate 132 and a color filter substrate 133, liquid crystals (not shown), driving chip packages 134 and 135, and a printed circuit board 136.

In the liquid crystal panel 131, the TFT substrate 132 includes gate lines (not shown), data lines (not shown), an array of TFTs (not shown), pixel electrodes, and other various components. The color filter substrate 133 includes color filters, black matrices (not shown), a common electrode, and other various components, and is disposed opposite to the TFT substrate 132. A liquid crystal layer having optical anisotropy is interposed between the TFT substrate 132 and the color filter substrate 133.

The driving chip packages 134 and 135 include gate-driving chip packages 134, and data-driving chip packages 135. The gate-driving chip packages 134 are connected to gate lines formed on the TFT substrate 132 and the data-driving chip packages 135 are connected to data lines formed on the TFT substrate 132. The driving chip packages 134 and 135 may be formed as a tape carrier package ("TCP") type, for example.

A plurality of electronic components are mounted on the printed circuit board 136 to provide gate-driving signals to the gate-driving chip packages 134 and data-driving signals to data-driving chip packages 135. The printed circuit board 136 may be bent to the rear surface of the receiving container 60 of the backlight assembly 100 and connected thereto.

The backlight assembly 100 for providing light to the liquid crystal panel 131 is disposed under the liquid crystal panel assembly 130.

As described above with reference to FIGS. 1A through 6, the backlight assembly 100 includes the light source unit 10, the optical sheets 40, mold frame 50, the receiving container 60, and the driving unit 70.

An upper receiving container 140 may be disposed to cover an upper portion the liquid crystal panel 131. The upper receiving container 140 may be combined with the receiving container 60 of the backlight assembly 100. A window (not shown) may be formed on a top surface of the upper receiving container 140 to expose the liquid crystal panel 131 to the outside.

While exemplary embodiments of the present invention have been described for illustrative purposes, it will be understood by those of ordinary skill in the art that various changes in form and details may be made therein without departing from the spirit and scope of the disclosure.

What is claimed is:

1. A backlight assembly comprising:
a light source unit including a circuit board, a light source disposed on a first plane of the circuit board, and at least one connection unit disposed on a second plane opposite to the first plane of the circuit board and electrically connected to the light source;
a receiving container having a bottom plate and sidewalls extending from edges of the bottom plate and receiving the light source unit, the bottom plate including at least one opening portion in which the connection unit is inserted and exposed to the outside; and
at least one driving unit disposed at a rear surface of the receiving container and connected to the connection unit for driving the light source unit, wherein the light source unit further includes a dummy circuit board disposed between the circuit board and the connection unit, and the dummy circuit board is substantially the same size as or smaller than the opening portion so as to be inserted into the opening portion.

2. The backlight assembly of claim 1, wherein the connection unit is one of a connector type or a socket type.

3. The backlight assembly of claim 1, wherein the bottom plate is of a rectangular shape.

4. The backlight assembly of claim 3, wherein the opening portion is formed along at least one of a long side or a short side of the bottom plate.

5. The backlight assembly of claim 1, wherein the driving unit is connected to the connection unit with a connector using one of a cable or a socket.

6. The backlight assembly of claim 1, further comprising an insulating tape attached to the receiving container to cover the opening portion.

7. The backlight assembly of claim 1, wherein the light source includes a plurality of light emitting diodes (LEDs).

8. A method of assembling a backlight assembly, the method comprising:
preparing a light source unit including a circuit board, a light source disposed on a first plane of the circuit board, and at least one connection unit disposed on a second plane opposite to the first plane of the circuit board and electrically connected to the light source, and a receiving container having a bottom plate and sidewalls extending from edges of the bottom plate and receiving the light source unit, the bottom plate including at least one opening portion in which the connection unit is inserted and exposed to the outside;
assembling the light source unit with the receiving container by receiving the light source unit in the receiving container so that the connection unit is exposed to the outside through the opening portion; and
disposing at least one driving unit at a rear surface of the receiving container and connecting the driving unit to the exposed connection unit, wherein the light source unit further includes a dummy circuit board disposed between the circuit board and the connection unit, and the dummy circuit board is substantially the same size as or smaller than the opening portion so as to be inserted into the opening portion.

9. The method of claim 8, wherein the connecting of the driving unit to the exposed connection unit comprises connecting the driving unit to the connection unit with a connector using one of a cable or a socket.

10. The method of claim 8, wherein the opening portion is formed along at least one of a long side or a short side of the bottom plate, and the connection unit is fittingly connected to the opening portion.

11. The method of claim 8, wherein after connecting the driving unit with the exposed connection unit, further comprising attaching an insulating tape to the receiving container to cover the opening portion.

12. A liquid crystal display comprising:
a liquid crystal display panel displaying an image; and a backlight assembly disposed under the liquid crystal display panel and providing light to the liquid crystal display panel, wherein the backlight assembly comprises:

a light source unit including a circuit board, a light source disposed on a first plane of the circuit board, and at least one connection unit disposed on a second plane opposite to the first plane of the circuit board and electrically connected to the light source;

a receiving container having a bottom plate and sidewalls extending from edges of the bottom plate and receiving the light source unit, the bottom plate including at least one opening portion in which the connection unit is inserted and exposed to the outside; and at least one driving unit disposed at a rear surface of the receiving container and connected to the connection unit for driving the light source unit, wherein the light source unit further includes a dummy circuit board disposed between the circuit board and the connection unit, and the dummy circuit board is substantially the same size as or smaller than the opening portion so as to be inserted into the opening portion.

13. The liquid crystal display of claim 12, wherein the bottom plate is of a rectangular shape.

14. The liquid crystal display of claim 13, wherein the opening portion is formed along at least one of a long side or a short side of the bottom plate.

15. The liquid crystal display of claim 12, wherein the driving unit is connected to the connection unit with a connector using one of a cable or a socket.

16. The liquid crystal display of claim 12, further comprising an insulating tape attached to the receiving container to cover the opening portion.

17. The liquid crystal display of claim 12, wherein the light source includes a plurality of light emitting diodes (LEDs).

* * * * *